Oct. 11, 1927.

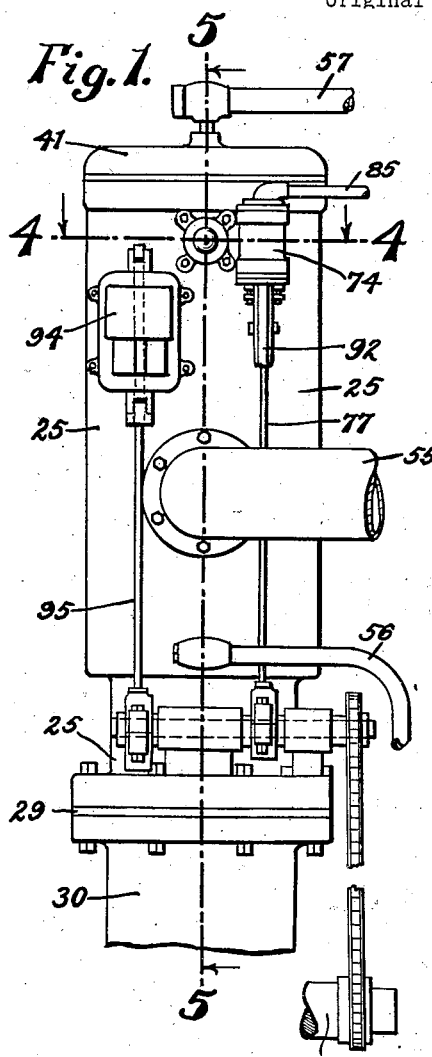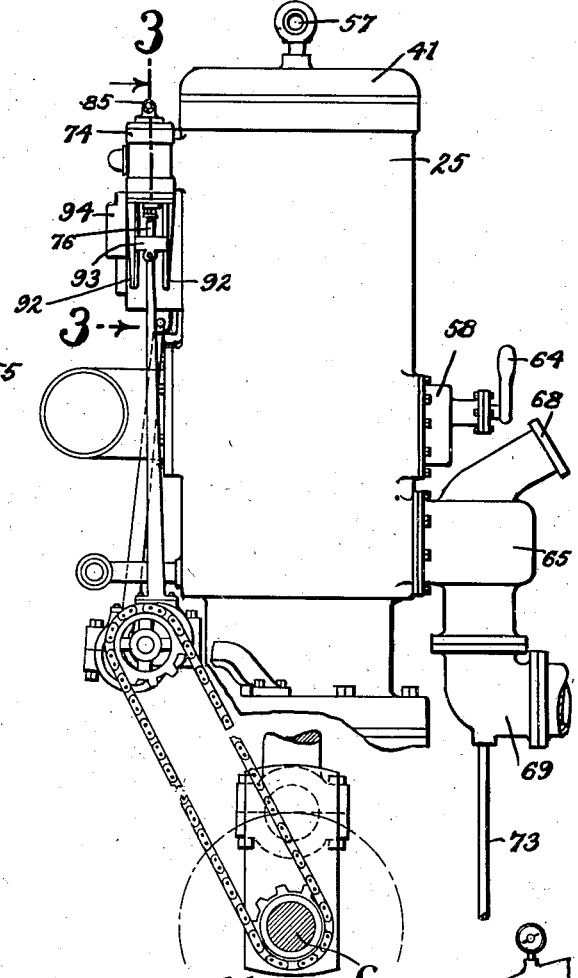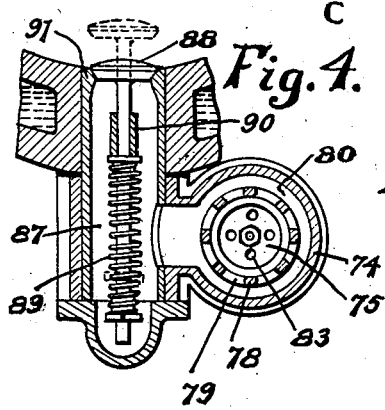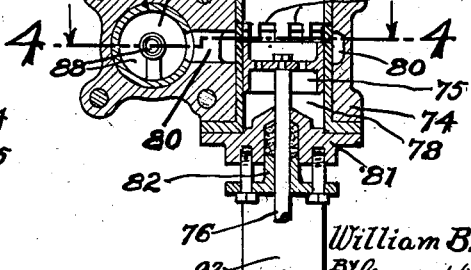

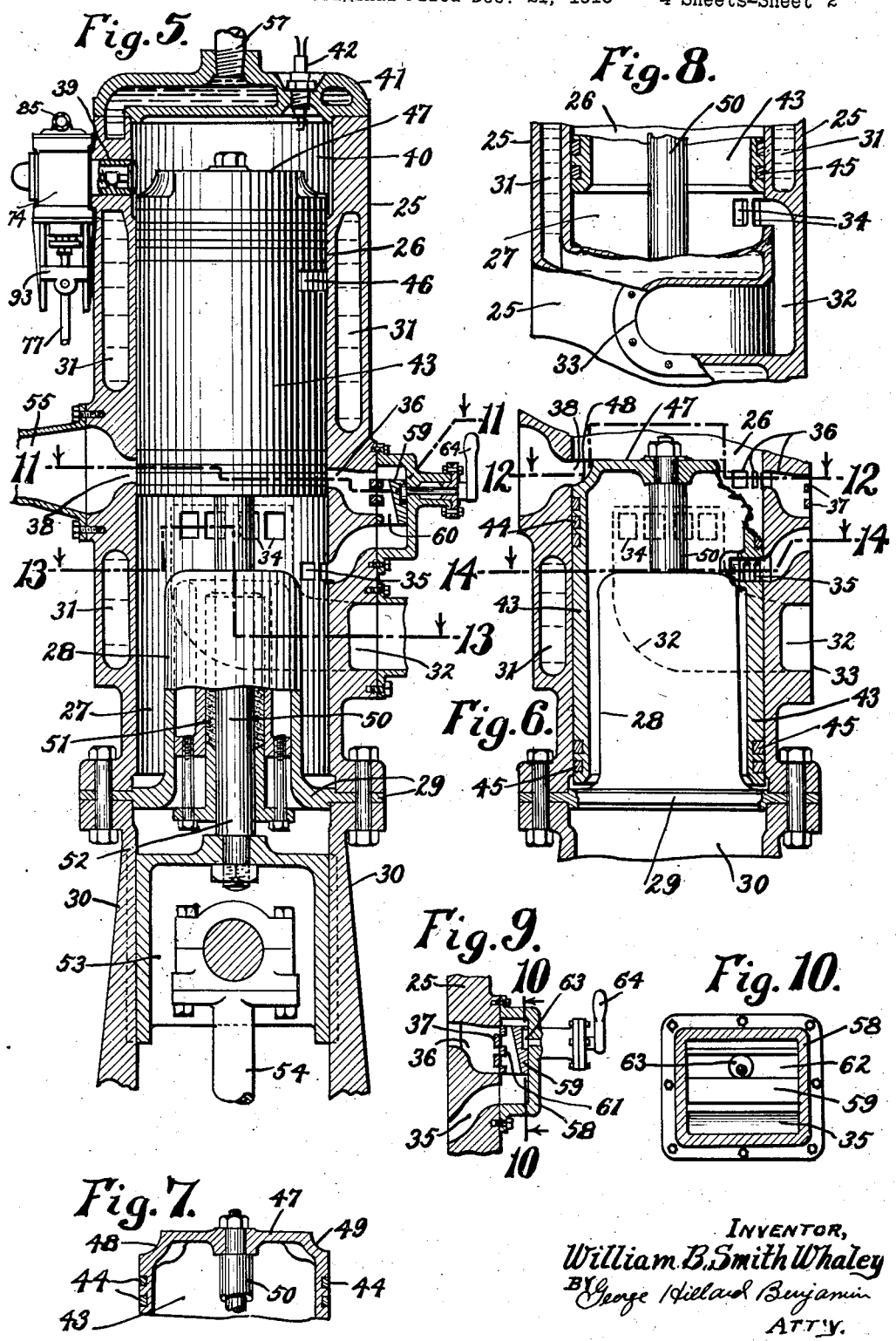

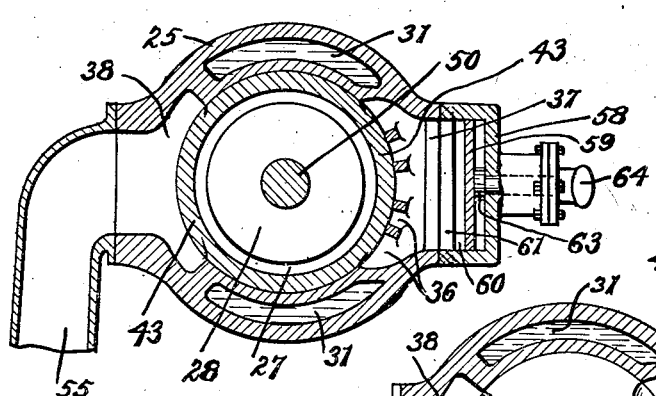
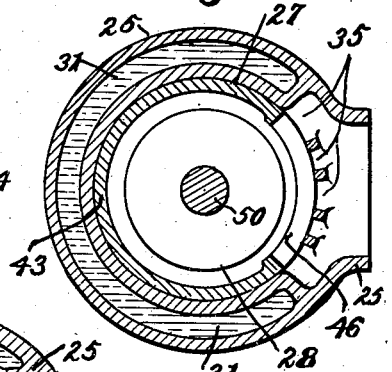
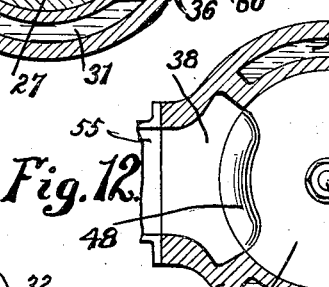
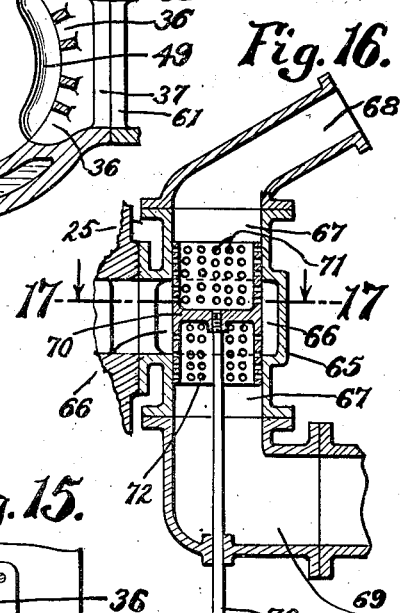
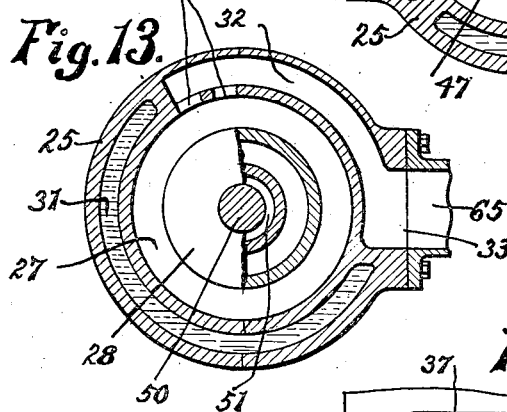
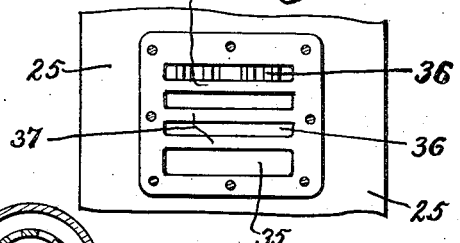
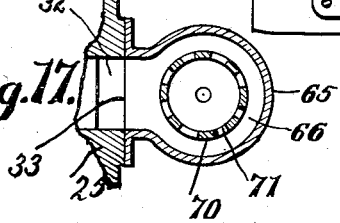

W. B. S. WHALEY 1,645,170

INTERNAL COMBUSTION ENGINE

Original Filed Dec. 21, 1916   4 Sheets-Sheet 4

INVENTOR,
William B. Smith Whaley
BY George Hillard Benjamin
ATT'Y.

Patented Oct. 11, 1927.

1,645,170

UNITED STATES PATENT OFFICE.

WILLIAM B. SMITH WHALEY, OF NEW YORK, N. Y., ASSIGNOR TO WHALEY ENGINE PATENTS, INC., A CORPORATION OF DELAWARE.

INTERNAL-COMBUSTION ENGINE.

Refiled for abandoned application Serial No. 138,207, filed December 21, 1916. This application filed January 23, 1923. Serial No. 614,506.

The object of my invention is to improve the retarded combustion cycle for internal combustion engines, and in that regard I introduce into the combustion chamber of the engine, during the burning operation of the initial fuel supply, an auxiliary supply of the needed co-operating fuel constituent to cause the complete combustion of the residual unburnt fuel elements of said initial supply, thus converting the inert elements of power of said unburnt fuel elements into the activity of energy by the chemical union thereof with said co-operating fuel constituent and thereby adding power to the engine at a point of effective crankage instead of exhausting the same, as is otherwise the case, and therefore a consequent waste and loss in the ordinary types of internal combustion engines, especially those operating on said retarded combustion cycle. And further, I continue with said introduction of the auxiliary supply beyond the point of complete combustion above referred to, to a point just previous to the reaching of the exhaust period, whereby the burnt gases tend to become stratified in the engine with the heavier gases on account of the heavier specific gravity found nearest the exhaust port thereof, so that upon the opening of the exhaust the burnt gases become promptly expelled from the cylinder and the same is left in the best condition possible ready to receive the fresh fuel charge for the next stroke. It will be here noted that my improved cycle is especially applicable to the valveless two-cycle types of engines (shown in the drawings) wherein the efficiency may be greatly increased when operating on my cycle and the engine may be rendered as flexible in its operation as the steam engine, as well as possessing the general appearance thereof.

Another object is to provide, in connection with the above types of valveless two-cycle engines, a regulating transfer valve in the transfer port for the pre-compressed medium for throttling the discharge of said medium into the combustion chamber from said pre-compression chamber according as the working conditions of the engine may require, instead of throttling the initial intake of the medium or mixture into the said pre-compression chamber before the pre-compression occurs therein.

Still another object is to provide a timing device for controlling the injection of the above said auxiliary supply for completing combustion of the burning medium within the cylinder and for stratifying the burnt gases in the combustion chamber thereof subsequent to said completed combustion therein and prior to the opening of the exhaust for the discharge of the waste gases from within the cylinder; said timing device serving also as a means to introduce compressed air within the cylinder for starting purposes as will hereinafter be further explained.

The embodiment of my invention, in its preferred form, includes a compressed air system which serves to supply the needed air to complete combustion of the residual unburnt carboniferous elements of the initial working medium, which, in order to produce retarded combustion, is preferably enriched in the first instance, and therefore will, upon the introduction of air into the combustion chamber during the burning period and before the flame becomes extinct therein from said system, complete combustion of all of the residual carboniferous fuel elements therein. Said compressed air system further serves to stratify the burnt gases in the cylinder before the exhaust port is opened and also serves as a starting medium for the engine.

Referring to the accompanying four sheets of drawings in which I show an embodiment of the invention in connection with a single cylinder of a vertical engine of the valveless two-cycle types,—it being here understood that the same may be applied to engines of one or more cylinders, whether of the horizontal or vertical types and whether of the valveless or valve types of two-cycle engines and also to a certain degree to four-cycle engines as well, and therefore I do not limit myself to any specific applications thereof or to the embodiment herein described.

Fig. 1 represents a front elevational view of the cylinder end of an engine embodying my invention.

Fig. 2 represents a side elevational view of Fig. 1.

Fig. 3 represents a cross-sectional view taken on line 3—3, Fig. 2, looking in the direction of the arrows, showing the timing-valve for the auxiliary compressed air system, or auxiliary fuel element supply of the engine, and the co-acting automatic cylinder valve thereof.

Fig. 4 represents a sectional view taken on lines 4—4, Figs. 1 and 3, looking in the direction of the arrows.

Fig. 5 represents a sectional view taken on line 5—5, Fig. 1, looking in the direction of the arrows, showing the piston positioned at the top of its stroke ready to start down on the firing or working stroke, the different cylinder ports and the cylinder valve of the auxiliary system of the engine communicating with the clearance chamber of the cylinder thereof.

Fig. 6 represents a part of the view shown in Fig. 5, but shows the piston partly broken at the upper right hand corner thereof and in its lowest position, in which position the transfer of the pre-compressed mixture takes place and is ushered into the upper section of the combustion chamber of the cylinder, while the exhaust port is full open exhausting the burnt gases from the cylinder.

Fig. 7 represents a sectional view of the top portion of the piston which is shown partly broken in Fig. 6.

Fig. 8 represents a part elevational and sectional view of the cylinder showing the fuel mixture intake jacket and the ports opening the same to the pre-compression chamber of the cylinder.

Fig. 9 represents a sectional view of the transfer ports of the cylinder and the throttling valve engaged therewith, similar to what is shown thereof in Fig. 5, but shows the "cut-off" position of the throttling valve instead of the "full open" position shown in said Fig. 5.

Fig. 10 represents a sectional view taken on line 10—10, Fig. 9, looking in the direction of the arrows, showing the adjustable eccentric member employed for shifting said throttling valve which regulates the transfer or discharge of the pre-compressed mixture into the combustion chamber of the cylinder.

Fig. 11 represents a sectional view taken on line 11—11, Fig. 5, looking in the direction of the arrows, showing the transfer-intake-ports of the combustion chamber of the cylinder for the pre-compressed fuel mixture and the exhaust port of the combustion chamber of the cylinder.

Fig. 12 represents a sectional view taken on line 12—12, Fig. 6, looking in the direction of the arrows, showing the piston in the exhaust and intake position porting with the exhaust and transfer-intake-ports of the cylinder.

Fig. 13 represents a sectional view taken on line 13—13, Fig. 5, showing the fuel intake-ports and jacket of the pre-compression chamber of the cylinder.

Fig. 14 represents a sectional view taken on line 14—14, Fig. 6, looking in the direction of the arrows.

Fig. 15 represents an elevational view of the cylinder of the engine with the throttling transfer valve and casing removed therefrom for showing the gridiron transfer-ports of the cylinder.

Fig. 16 represents a sectional view taken through the mixing and proportioning valve of the fuel elements taken into the pre-compression chamber of the cylinder.

Fig. 17 represents a sectional view taken on line 17—17, Fig. 16, looking in the direction of the the arrows.

Figure 20:
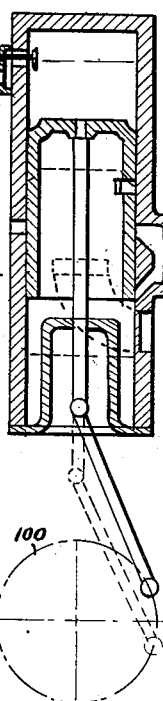
Figure 18:
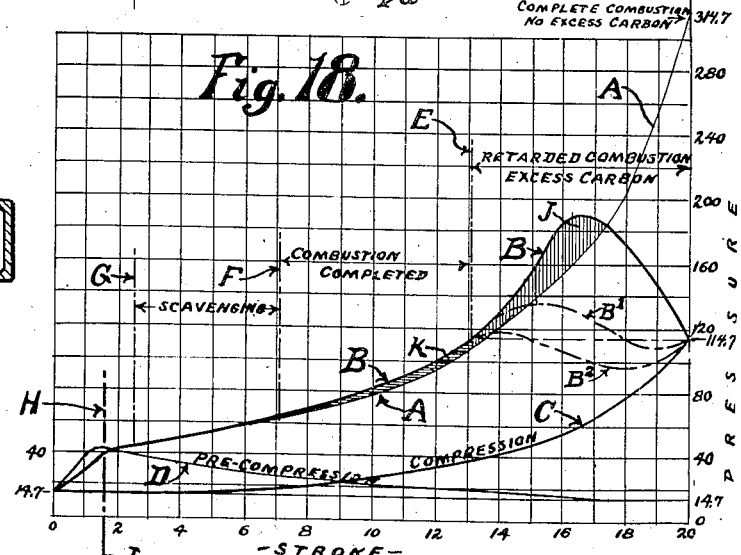
Fig. 18 represents a theoretical card of my improved retarded combustion cycle.

Fig. 20 represents the position of the piston and the corresponding conditions of the main timing and co-acting valves of the engine, corresponding to a point in advance of the point "E" of retarded combustion represented on the card in Fig. 18, the dotted lines indicating the position of the piston corresponding to the point of completed combustion indicated on the card in said Fig. 18 when stratification of the burnt gases in the cylinder commences.

Figure 21:
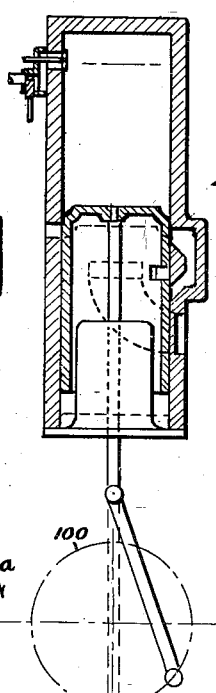

Fig. 21 represents the position of the piston when both the timing and co-acting valves of the auxiliary system are closed, for cutting off the supply of the stratifying medium.

Figure 22:
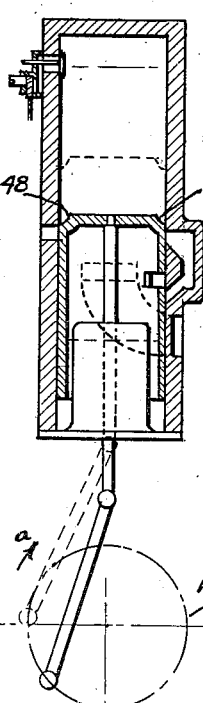

Fig. 22 represents the position of the piston starting compression in the combustion chamber.

Figure 23:
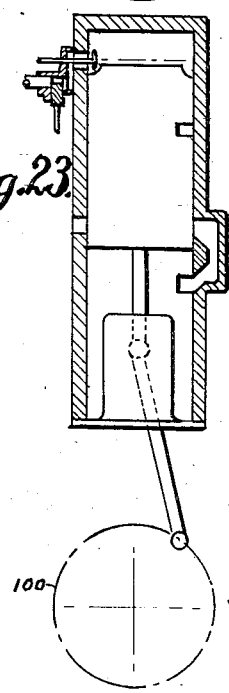

Fig. 23 represents the piston being started on the down stroke by the pressure of the incoming compressed air through the timing and co-acting valve, as occurring for starting purposes.

The terms employed herein are used in the generic and descriptive sense, and therefore are not intended primarily as terms of limitation.

Like numerals refer to like parts throughout the several views of the drawings.

The numeral 25 in its entirety represents a cylinder of my type which has the combustion chamber 26 at the upper part thereof and the pre-compression chamber 27 at the lower part thereof, the latter end being provided preferably with the removable inner-cylinder 28 which is suitably fitted and secured within the pre-compression end 27, of the cylinder 25, as by means of the flange, 29, which is bolted between the cylinder itself and the crank-case or supports, 30, of the engine. The cylinder 25, is preferably provided with a water-jacket, 31, wherever necessary, and is provided with the mixture-intake jacket, 32, which is open at 33 and terminates in suitable intake ports, 34, communicating with and open to the pre-compression chamber 27, toward the upper part thereof; the lower outlet transfer ports, 35, which are open to the pre-compression chamber 27; the upper inlet transfer port, 36, which opens into the combustion chamber 26, and is bridged with the gridiron bars, 37, at the entrance thereof; the exhaust port, 38, which is open to the lower end of the combustion chamber 26, of the cylinder; and the valve-port, 39, which is preferably located in the clearance chamber, 40, of the combustion chamber 26. The cylinder head, 41, is preferably provided with the spark-plug, 42, and may be made integral with the cylinder 25, or rigidly secured thereto in any suitable manner, according as desired. 43 represents a skirt type of piston housing the upper and lower piston rings, 44 and 45, respectively, between which is located the discharge or transfer port, 46, which registers with the lower outlet-transfer-port, 35, Fig. 6, when in the lower part of its stroke. The piston-head, 47, on the exhaust side is preferably provided with the scooped exhaust-port-section 48, and on the intake side is preferably provided with the inlet-baffle-section, 49. 50 represents the piston-rod which is secured to the piston, 43, in any suitable manner and slidably operates within the gland-box, 51, preferably provided therefor in the inner-cylinder, 28, Fig. 5. The lower end, 52, of the piston-rod, 50, in the drawing is shown coupled with a cross-head, 53, which slidably operates on the supports, 30 and carries pivotally secured thereto, the connecting-rod 54, the lower end of which is connected in any suitable manner with the crank-shaft of the engine.

55 represents the exhaust pipe of the engine; 56, the jacket-water-inlet of the engine, and 57 the outlet therefor. 58 represents the transfer-throttle-valve-casing which is rigidly secured to the cylinder, 25, to be in the range with the transfer ports of the cylinder, and houses the slidable throttle-valve, 59, which is provided with the main port, 60; the co-acting gridiron bars 61; and the eccentric recess, 62, in which operates the operating eccentric, 63, which is secured to operate with the transfer throttling lever, 64, by means of which the valve, 59, may be operated and positioned to allow any desired throttling of the transferring mixture from the pre-compression chamber of the cylinder to the combustion chamber thereof.

65 represents the mixing valve-casing of the engine, which is bolted to the engine and is provided with the mixing compartment, 66, (which communicates with the mixture inlet, 32,) and the bore, 67, the upper part of which is open to the gas inlet, 68, while the lower part is open to the air inlet, 69. 70 is the mixing piston valve which is preferably partitioned as shown, and provided with the gas perforations, 71, above the partition, and the air perforations, 72, below said partition, and slidably fits the bore, 67, and may be regulably positioned and set therein by means of the regulating stem, 73, for properly proportioning the elements of the fuel mixture for the engine.

74 represents the main valve casing for the compressed air-timing-valve, 75, which casing is suitably secured to the cylinder, 25, and is preferably of the piston type, (Fig. 3), operated by the reciprocating action communicated to the valve-stem, 76, by the reciprocating link, 77, which may be caused to reciprocate up and down, by any suitable means, as by an eccentric, cam or otherwise, according as may be desired, preferably by means of the eccentric, as shown in Figs 1 and 2, which is coupled in some suitable manner to operate with the crank shaft, C. The valve, 75, preferably slidably operates within a sleeve-member, 78, which is suitably supplied with the ports, 79, which are open to the receiving compartment, 80, supplied in the casing, 74, and which ports, 79, may be suitably designed to allow the required flow of compressed air therethrough when the valve, 75, uncovers the same; also the use of the sleeve-member allows for the cutting of the ports therein, in a manner which enables the proper positioning of the ports for timing purposes within the valve casing. The lower end of the casing member, 74, is closed with the cap, 81, which is provided with the gland box, 82, through which the valve-stem, 76, operates. The piston-valve is therefore preferably perforated with the perforations, 83, for preventing the pocketing of the compressed air in the lower part of the valve casing, as might otherwise be the case, and which would be likely to interfere with the balance of the valve. The top of the casing, 74, is provided with the admission cap, 84, which opens the casing through the supply-pipe 85, with the auxiliary compressed air supply for the engine as for example, the receiver, 86, Fig. 3, or some such other suitable means, which receiver may be coupled with an air pump operated by the engine for keeping the same continually supplied with compressed air of the proper pressure. It may be noted here that the receiver may be supplied with the necessary compressed air by trunking the cross-head of the engine if desired. The receiving compartment, 80, communicates with the auxiliary-valve-compartment, 87, which is opened to the combustion chamber, 26, of the cylinder, 25, through the automatic cylinder air valve, 88, which is preferably of the ordinary poppet valve type and is provided with the expansion spring, 89, (Fig. 4), which abuts the bearing-lug, 90, of the casing member, 91, which casing member fits within the cylinder air valve port, 39. The valve, 88, may be automatically actuated by the difference of pressure existing thereupon on either side thereof. The valve casing, 74, may be preferably provided with the rigid guide members, 92, (Figs. 1 and 2), which permit the use of the cross-head guide member, 93, as shown in said Figs. 1 and 2.

94 represents an ordinary type of igniter which is also preferably operated by a reciprocating stroke, as by the reciprocating action communicated to the igniter link, 95, which may be by the same or similar means employed in actuating the air-valve reciprocating link, 77, as shown in Figs. 1 and 2.

In the diagrammatic views, Figs. 19 to 23, inclusive, the parts are numbered similar to the corresponding parts of the engine hereinbefore referred to, and 100 represents the crank-circle.

In Fig. 18, "A" represents the adiabatic curve of the engine due to the combustion of an explosive charge compressed to 114.7 lbs. ab., "B" represents the working curve of an engine operated on my improved retarded combustion cycle, "C" represents the compression curve in the combustion chamber, "D" represents the pre-compression curve of the pre-compression chamber, "E" represents the point where the retarded combustion, due to excess carbon in the mixture, is about to cease, being the point where the compressed air ordinarily enters the cylinder to support and complete the combustion of the residual carbon of the initial mixture remaining unburnt in the combustion chamber of the cylinder. "F" represents the final point of completed combustion due to the air supplied in the cylinder from "E" to "F" from which point "F" on to the point "G" the stratifying medium is being introduced in the combustion chamber of the cylinder. "H" represents the point at which the exhaust port of the cylinder opens; and "I" represents the point at which same closes. The sectioned area "J" represents the additional "heat influx" due to retarded combustion, while the sectioned area "K" represents the additional "heat influx" due to completed combustion.

Having thus described the parts of my invention in the detail, the method of operation thereof and the principle involved for producing the improved cycle which I disclose and claim herein, is as follows:

It will be here noted that the drawings are proportioned to show an embodiment of the invention in connection with a cylinder having a bore and stroke approximately 14 x 20 inches and the card in Fig. 18 is figured therefor, it being understood in that connection, however, that I am not limited thereto for the invention is equally applicable to other sizes or ratios (greater or smaller) within reasonable limits therefrom.

First, the mixing valve, 70, which may be of any suitable type, preferably like the one shown in Fig. 16, is set to allow the proper proportioning of the fuel elements, as for example, the air and the gas to provide for an enriched mixture, say in the proportion of one part gas to about four parts air, which mixture lacks oxygen and therefore will ignite and burn, but not completely, and will not explode,—it being a known fact that such a mixture cannot explode as is required of mixtures operating explosive types of engines, while on the other hand, however, it will ignite and burn, but not completely because of the lack of oxygen in the initial medium, which oxygen, in supporting combustion thereof is utilized before all of the carboniferous elements are burnt, therefore leaving a residual of unburnt fuel elements which in my cycle are supplied during the period of burning in the cylinder with the necessary air to cause complete combustion of all such fuel elements originally contained within the initial medium as will be later explained.

Second, the compressed air supply, 86, for the engine should be provided with compressed air of a suitable pressure, say 114.7 lbs., ab., and open to the timing-valve, 75, of the engine, which is timed to open shortly after the piston passes the head dead center, say about 5 or 10 degrees later as indicated by the dotted position, Fig. 19.

Figure 19:
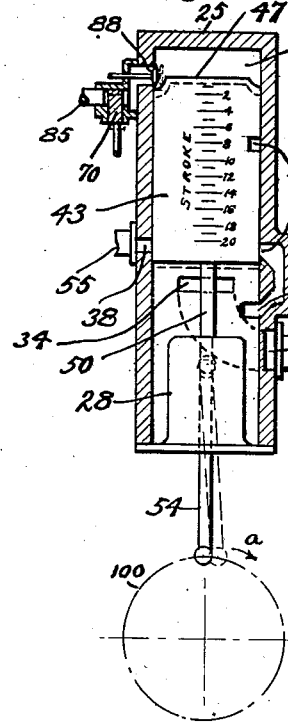
Fig. 19 represents a diagrammatic view showing the piston ready to start down on the firing stroke, when the main timing valve, as well as the co-acting valve of the auxiliary system of the engine, are closed as shown,—the dotted lines indicating the position of the piston corresponding to the position thereof when said main timing-valve of said auxiliary system opens.

Now, with the mixing valve set, the compressed air of the proper pressure ready, and the electrical ignition means ready for operation and which latter means is timed preferably to spark when the piston is at the top of its stroke as shown in Figs. 5 and 19, the engine performs in the following manner:—

When starting the engine cold and with no ignitible mixture in the combustion chamber of the cylinder, or with a pressure of the air or mixture therein less than the pressure of the compressed air supply for the engine, or with the spark failing to ignite the mixture therein, if the timing-valve, 75, is open because of the position of the piston as would naturally occur between the 5 degrees position shown in Fig. 19 and the full position of the piston shown in Fig. 21, between which the positions of the piston is the range of piston travel in which the valve, 75, is open, the same opening on the dotted 5 degrees position shown in Fig. 19 and closing in the full position shown in Fig. 21, the compressed air will naturally enter the combustion chamber and force the piston down, thus starting the engine and therefore serving as a self-starter for the engine. Therefore, when the crank-shaft of the engine operates in the direction of the arrows marked "a" in the diagrammatic views of the drawings, and when the working medium in the combustion chamber is not capable of starting the engine, or for any other of the reasons above suggested, if the piston lies in a position within the "open range" of the air-timing-valve, 75, of the engine, the compressed air will force its way into the combustion chamber of the cylinder and by the automatic auxiliary valve, 88, because of the difference of pressures existing between the air or mixture within the combustion cylinder and the compressed air introduced by the air-timing-valve, 75.

Thus it will be here understood that the auxiliary air system in this instance serves as a starting means for the engine, and which capacity is only incidental to the primary functions thereof, which will hereinafter be fully explained.

The piston being started and forced down by the pressure of the compressed air admitted as just explained in the combustion chamber of the cylinder or by the burning and expansion of the fuel medium therein, compresses the mixture, which enters the cylinder at atmospheric pressure, in the pre-compression chamber, 27, immediately after the piston covers and closes the inlet-ports, 34, and keeps on compressing the same until it (the piston) practically reaches the bottom of its stroke, Fig. 6, when the piston opens the exhaust-port, 38, to the combustion chamber, 26, of the cylinder, as shown in Fig. 6 and in which position the piston discharge or transfer-port 46, registers with the pre-compression chamber transfer-ports, 35, and the baffle section, 49, of the piston, 43, registers with the combustion chamber transfer-ports, 36, which position of the piston when the transfer-valve, 59, is open, as shown in Fig. 5, allows the pre-compressed mixture which has been compressed in the pre-compression chamber, 27, to about forty odd pounds, absolute to pass through the piston-transfer-port, 46, through the transfer valve, 59, through the transfer-ports, 36, when the same is deflected by the baffle section, 49, of the piston which registers with said transfer-ports, 36, to shoot upward into the top section of the combustion chamber of the cylinder, while the waste gases from the preceding stroke are discharged through the open exhaust port, 38, (Fig. 6).

From an inspection of Figs. 5 and 6, especially the latter, where the piston is shown in its lowest position, it will be observed that the vertical dimension of the exhaust port, 38, is greater than that of the transfer-ports, 36, and is therefore opened by the piston (which has a deeper exhaust recess, 48, than the baffle section, 49, as shown in Fig. 7) before the transfer-ports, 36, are opened (the lower parts of the exhaust and transfer ports, being practically in the same plane Fig. 6) in order to relieve the pressure of the exhaust gases before the pre-compressed charge of new medium from the pre-compression chamber is transferred into the working end or combustion chamber of the cylinder.

It will be here noted that shortly after the air-timing-valve, 75, closes, the auxiliary-valve, 88, also closes, so that practically from the position of the piston shown in full in Fig. 21, to the dotted position indicated in Fig. 19, the auxiliary valve, 88, as well as the main air-timing-valve, 75, are both closed, and therefore as the pre-compressed mixture enters the combustion chamber through the transfer-valve, the auxiliary valve, 88, is seated and closed and the same will be confined to the combustion chamber of the engine. Then, as the piston, 43, ascends in its stroke towards the head position thereof, it closes the exhaust and transfer ports, 38 and 36, respectively, and naturally compresses the pre-compressed mixture in the combustion chamber, 26, of the cylinder into the clearance space, 40, which will allow a final compression of, say, 114.7 lbs., ab., to the combustible working charge compressed therein, ready for firing.

Simultaneously with compressing the pre-compressed mixture in the combustion chamber of the cylinder, the piston, when uncovering the ports, 34, as it ascends upward, sucks in a new charge of fuel through the mixing valve, 70, into the pre-compression chamber, which, on the following descending stroke of the piston, will be pre-compressed, as heretofore explained, and when the piston registers its discharge-port, 46, with the transfer port, 35, will be transferred into the combustion chamber, 26, of the cylinder as before.

With the pre-compressed charge compressed into the clearance chamber, 40, as shown in Fig. 5, and the piston on head-end dead center, the same is ready to start down on its working or firing stroke, (it being here observed that with the piston in that position the transfer ports, 36, and the exhaust port, 38, are completely sealed and the intake ports, 34, are uncovered and open and free to draw in the charge to be pre-compressed in the pre-compression chamber, 27, of the cylinder). At about this point, the igniter, 94, causes a spark to be made between the points of the spark-plug, 42, in the clearance chamber, 40, of the cylinder, 25, when the compressed medium is ignited and burns but does not instantly explode, as is usualy the case in ordinary gas motor practice, because of the too rich quality of the mixture used in the cylinder and as already explained; thus right here it will be observed that my cycle differs from the ordinary explosive types of internal combustion engines and burns the mixture instead of exploding it, thereby causing a retarded combustion, which from an inspection of the card in Fig. 18 of the curve, "B" will be seen to exert its greatest torque beyond the flat or upper section of the crank circle 100, instead of as is otherwise the case in explosive engines where according to the curve, "A" which represents the adiabatic curve of an explosive motor, same figure, the maximum working effort is located near the point of explosion, which is near the dead center position on the crank-circle or on the top and flat of said circle, it also being observed here that the pressure of an explosive charge compressed to 114.7 lbs., ab., will instantly jump to approximately 314.7 lbs., ab., which would require heavier construction to withstand same, and which also correspondingly increases the temperature within the cylinder suddenly and carries greater radiating losses in the cylinder walls therewith than the retarded combustion cycle which more nearly approaches the constant pressure engine, but the range of which was more or less limited and had not yet been looked upon as sufficiently flexible to warrant the adoption of said cycle by the engineers.

My invention treats with the widening of the range and scope of the retarded combustion cycle and is shown embodied herein in connection with a two-cycle valveless engine without being limited thereto, since the same may be with little modification applied to the four-cycle engines as well, and in connection with such two-cycle engine operates as follows:

As soon as firing starts, which is preferably on head dead center, the piston starts downward on its working stroke, and when the crank has gone about five degrees, (indicated by dotted lines, Fig. 19), the main air valve, 75, is timed to open, when the compressed air at 114.7 lbs., ab., fills up the auxiliary air chamber, 87, but since the firing increases the pressure within the cylinder, which originaly before firing had reached 114.7 lbs., ab., being the pressure of compression as shown on the card, Fig. 18, the pressure within the cylinder overcomes the pressure in back of the auxiliary air valve, 88, which, on account of the greater pressure in the combustion chamber, is closed and seated with the compressed air of 114.7 lbs., ab., behind it and open to the supply through the then open timing-valve, 75. The auxiliary valve, 88, will thus remain closed during the downward travel of the piston until it reaches the position shown in full in Fig. 20, which corresponds to the "E" position on the card in Fig. 18, where it will be observed the pressure of the burning mixture has reached 114.7 lbs., ab., when said pressure within the cylinder has become reduced to the pressure of the compressed air within the air chamber, 87, and behind the valve, 88, where, upon passing that point, the valve, 88, automatically opens as shown in Fig. 20 to admit the fresh compressed air which furnishes the necessary oxygen with which to complete the combustion of the excess and unburnt fuel or carbon of the initial fuel charge within the cylinder. The air under pressure thus entering at that point when the flame is still alive in the cylinder, revives the mixture and supports further combustion within the cylinder and keeps coming in continually because the valve, 75, is still open, until it closes at "G" on the card corresponding to the full position, Fig. 21, an inch or so before the exhaust-port begins to open; the burning of such excess fuels or carbons continuing only, however, to point "F" on the curve, which corresponds to the dotted position, Fig. 20. Therefore, it will be observed that the operation of my cycle on the working stroke of the piston proceeds as follows: With the firing of the non-explosive charge, compresed to the desired predetermined pressure, as, for example, about 114.7 lbs., ab., retarded combustion and expansion occur to point "E" on the card along curve "B", then in the vicinity of point "E" compressed air, which is preferably of the same pressure as the compression pressure of the fuel medium is automatically admitted within the cylinder, while retarded combustion is still occurring therein, but the pressure thereof having gone below the pressure of the compressed air behind the valve, 88, this incoming fresh air supplies the necessary oxygen for completing the combustion of the excess and residual unburnt carbons or fuels in the mixture within the cylinder, and thus adds power to the engine; "F" representing the point on the curve at "B" at which all of the carbons and fuels would be entirely utilized and burnt with the support of the incoming compressed air. Since the main timing-air-valve, 75, closes at "G" (Fig. 18) it will be observed that the compressed air under the pressure of 114.7 lbs., ab., will continue to be injected within the combutsion chamber of the cylinder and between "F" and "G" on the stroke corresponding to the dotted position, Fig. 20, and the full position, Fig. 21, respectively, expansion and stratification of the gases will occur in the combustion chamber, therefore thoroughly treating the burnt gases in the combustion chamber before the piston reaches the exhaust position, "H" on the card, so that when the exhaust port opens, the combustion chamber of the cylinder is thoroughly freed of the waste and burnt gases.

The injected air, entering the cylinder after complete combustion occurs, stratifies the waste or burnt gases in the combustion chamber and tends to lie in a layer on top of them, the specific gravity of the waste or burnt gases being heavier naturally tends to cause the same to assume the lower position, and therefore, as soon as the exhaust port opens the waste or burnt gases discharging against the atmospheric pressure of exhaust, become liberated from within the combustion chamber of the engine and consequently the incoming transferred pre-compressed medium commingles with the expanded stratifying air which replaces the waste gases exhausting from the combustion chamber instead of co-mingling with foul gases filling the chamber as would otherwise be the case. Therefore, the method of stratifying the burnt gases in the combustion chamber before exhaust opens not only rids the chamber of all foul and waste gases when exhaust opens, but provides a condition within the combustion chamber for the new working medium introduced therein to be unaffected and therefore allows for best results therefrom, which adds to the efficiency of the engine.

Thus it will be observed from the card, Fig. 18, that on the whole greater efficiency results from my cycle than can be obtained in the ordinary explosive types of engines, it being understood that the absence of high temperatures carries with it less heat loss; also the introduced compressed air supporting combustion adds pressure at a point of most favorable crankage and therefore greatly increases the power to the engine.

The functions hereinabove explained are repeated with each cycle, and it will be observed that the engine may compress its own supply of compressed air, as by trunking the cross-head or actuating a small air pump which, in either case, may be provided with an automatic cut-out for automatically cutting out when the supply tank or receiver becomes charged to capacity with the desired pressure therein.

It will be observed that the adjustable transfer throttling valve, 59, which is manipulated through the action of the throttling lever, may be set and adjusted to allow any desired throttling from "full open" to absolute "cut-off," as shown in Figs. 5 and 9, respectively, the latter figure showing the gridiron bars 61, of the throttling valve covering the opening spaces between the gridiron bars, 47, of the combustion chamber transfer port, 36, and that by means of said throttling valve the engine may be controlled to suit conditions under which the same may be operating, B¹ and B² in Fig. 18, representing the effect of throttling under two different adjustments of the transfer valve, 59. Also, that while I show a slide-valve type of valve employed as transfer-valve any other type of valve may be employed in place thereof to equal advantage, as for example, a piston valve or the like, and I do not wish to be limited to the use of the slide-valve herein shown.

It will be thus observed that the retarded combustion cycle operated along the lines herein disclosed provides for most favorable results, in that my improved cycle broadens the flexibility and scope as well as the range of operation of the engine, securing for the engine every unit of power possible to be had from the working medium operating therein and enabling the energy yielding therefrom to be applied to points of most favorable crankage.

It will be observed that the auxiliary supply of compressed air being introduced into the combustion chamber during the burning and expansion period of the working medium and at a point just previous to the extinguishing of the flame thereof, will cause all excess and residual unburnt fuel elements or carbons within said medium to burn up and therefore yield additional power to the engine instead of being wasted in the exhaust, as they otherwise would be were it not for the introduction of the oxygen in the air supplied therein for the purpose, which therefore results in bringing about complete combustion of the working medium and a consequent increase in efficiency for the engine. That function of the auxiliary air system resulting in the utilizing of the excess and unburnt fuel constituents of the enriched medium along with the feature of stratifying the burnt gases in the combustion chamber after the completed combustion occurs therein before the exhaust is reached, is the primary object of the auxiliary compressed air system, and which system carries with it the secondary function hereinabove referred to in the nature of the self-starting feature, so that an engine of three cylinders, or any multiple of three, equipped with said auxiliary air system may positively be relied upon to be not only self-starting but reversing as well, because of the position of the cranks thereof; each cylinder being provided with an air-timing-valve therefor, as explained in the case of the cylinder, 25, in the drawings.

The type of engine to which the invention may be embodied, as herein disclosed, is not limited to either the vertical or the horizontal types, and it will be understood that the manipulation and the performance of the engine, as I have explained herein, produces more nearly the action of an ordinary steam engine, and in fact the appearance of the engine itself may be made along the lines of the steam engine; and further, that the work necessary for operating the ignition mechanism and the air-timing mechanism is very light and therefore may be designed with the simplest mechanism possible; any ordinary valve gear mechanism being suitable for providing the reciprocating action to the ignition means or the air-timing means.

It will be further understood that the expansion of the residual pre-compressed mixture in the pre-compression chamber or the cylinder, which is left after the supply is transferred into the combustion chamber of the cylinder, has its effect upon the underside of the piston, and partially offsets any loss brought on by the ordinary pre-compression of the mixture therein. Thus, it will be here understood that while I have described the engine as operating on an enriched initial mixture and therefore to injecting a supply of air for completing combustion thereof, I do not wish to be limited against reversing the situation and operating the engine on a lean initial mixture instead, and in which instance I may, on the same principle, inject a carboniferous or other fuel supply for supporting combustion during the burning and expansion stroke of the working medium employed.

It must therefore be very evident that a very marked economy over either the two or four-cycle types of gas engines must result from the cycle, especially when applied to the two-cycle valveless pre-compression type of engine herein shown and described. The engine runs practically noiseless and very smooth at all loads and as flexible in control and action as the steam engine, therefore producing an efficient gas engine which in every respect approaches the principle and practice of the steam engine. Also, from an inspection of the card, Fig. 18, it will be observed that the pressures existing in the cylinder under the retarded combustion cycle with my improved method of operating the same, are not excessive and do not require heavy construction in the design of the engine; that the additional "heat influx", "J", due to retarded combustion, comes at a point of effective crankage on the card and almost balances the work done during the same travel of the piston by the explosive cycle and represented by the curve, "A", taking into consideration in connection therewith the loss due to cylinder radiation in explosive cycles; that the additional "heat influx", "K", created by the operation of supporting complete combustion of the initial burning but non-explosive medium also comes at a point on the curve of effective crankage and therefore, a decided gain to the cycle; and that the stratifying feature occurring between point "F" and point "H" on the curve thoroughly cleans the combustion chamber and stratifies the waste gases therein so that the incoming new working medium with the force of pre-compression behind it is delivered into the clearance space of the cylinder where the pure stratifying air settles, as above explained, when best results can be obtained from said working medium,—all of which features point strongly in favor of the improved cycle and show the same to be more efficient than the ordinary two-cycle explosive or retarded combustion cycles, and equal to, if not greater than the efficiency of the ordinary four-cycle engine. My improved cycle when employed with the ordinary two-cycle engine greatly increases the scope thereof, inasmuch as the same is not restricted in size as the ordinary two-cycle engine heretofore has been, and permits of the application to cylinders having a bore of 20 inches or more, which is much greater than the ordinary two-cycle engine can permit and still run efficiently,—it being a known fact that in practice the two cycle engine has been limited to small sizes, for reasons commonly known to persons familiar with the art.

This case is for the same invention as that described in my former application, Serial No. 138,207, filed December 21, 1916.

Having thus described my invention, what I claim as new is:—

1. The herein described cycle for internal combustion engines, comprising the admission into the combustion chamber of an enriched initial mixture, rich in carboniferous elements and relatively lacking in air to support incomplete burning of said carboniferous elements; burning and expanding said initial mixture; then injecting air under pressure into said burning mixture continuously in response to a change in pressure in said combustion chamber from a point previous to the extinguishment of said initial mixture, and subsequent thereto to a point just previous to the exhaust period of the cycle, and finally exhausting the burnt products from the combustion chamber.

2. The herein described cycle for internal combustion engines, comprising the following steps; charging the cylinder with an initial mixture having a relatively excessive amount of carboniferous matter with a relatively insufficient amount of air to provide thereby retarded and incomplete combustion of said initial mixture; then burning said initial mixture and allowing the same to expand; then during the burning and expansion of said initial mixture and subsequent to the passing of the pressure peak due to the rise in pressure of said burning mixture and while the flame is still alive, injecting air under pressure into said burning mixture in response to a change in pressure in said combustion chamber for vitalizing the same and for supplying the lacking air to complete combustion of the then residual and unburnt carboniferous elements remaining in said initial mixture; continuing with said air injection beyond the point of complete combustion of said initial carboniferous matter to a point just previous to the exhaust period for setting up a stratifying feature to the burnt and waste gases resulting from the aforesaid combustion of the initial carboniferous matter in the cylinder for conditioning the same to expel the heavier and fouler gases first from the cylinder upon opening the exhaust thereof; and finally exhausting the cylinder.

3. The herein described cycle for internal combustion engines, comprising the following steps; charging the cylinder with an initial mixture having a relatively excessive amount of carboniferous matter with a relatively insufficient amount of air to provide thereby a retarded and incomplete combustion of said initial mixture; compressing said mixture in the combustion chamber to a predetermined point; igniting and burning said compressed mixture; then during burning and expansion thereof, but subsequent to passing the pressure peak due to said burning and expansion and previous to the point of extinguishment of the flame in said burning mixture, injecting air under pressure therein in response to a change in pressure in said combustion chamber for vitalizing the elements of said burning mixture and supporting combustion of the then remaining residual and excessive unburnt carboniferous elements of said initial mixture; continuing with said air injection beyond and subsequent to the completion of combustion of said initial mixture to a point just preceding the opening of the exhaust of the engine for setting up a stratifying feature to the burnt products of combustion, whereby the heavier gases will be localized near the exhaust port of the engine to assure the expulsion of said gases therefrom; and finally exhausting the cylinder.

4. The herein described cycle for internal combustion engines, comprising precompressing an initial fuel mixture which is rich in carboniferous elements and relatively too poor in air to support complete combustion of said mixture; then again compressing said fuel mixture to a higher predetermined pressure than the aforesaid precompression pressure; then burning the same and allowing expansion thereof; then previous to the point of extinguishment thereof injecting compressed air into the burning mixture to support combustion of the excess and residual unburnt carboniferous fuel constituents and thereafter continuing with said air injection subsequent to the complete combustion of the initial fuel mixture and cutting off same at a point near the exhaust opening of the cycle; and finally exhausting the burnt products.

5. The herein described method of operation for internal combustion engines, which consists in introducing into the combustion chamber of the engine a mixture of carboniferous elements and air, the air content of such mixture being less than that sufficient for complete oxidation of the carboniferous elements; compressing said mixture; starting the slow combustion of said mixture; then introducing air under pressure in said mixture while burning in response to a change in pressure in said combustion chamber, and beyond the point of extinguishment; expanding said air to a point in the cycle just prior to the exhaust, and finally exhausting the gases of combustion.

6. The herein described method of operation for internal combustion engines, which consists in introducing into the combustion chamber of the engine, a fixed mixture of pre-compressed carboniferous elements and air, the air content in such mixture being less than sufficient for complete oxidation of the carboniferous elements; compressing said mixture; starting slow combustion of the same; introducing air into said mixture during and after combustion; continuing such introduction of air to a point just previous to the exhaust, and finally exhausting the gases of combustion.

7. The herein described method of operation for internal combustion engines, which consists in introducing into the cylinder of the engine a mixture of carboniferous elements and air, the air content of such mixture being less than that sufficient for complete oxidation of the carboniferous elements; starting slow combustion of the mixture; then injecting air under pressure into the cylinder, when the pressure in the cylinder has dropped to a predetermined amount, and while the carboniferous elements are still burning, and continuing the same beyond the point of complete combustion, to a point prior to the exhaust, and finally exhausting the gases of combustion.

8. The herein described method of operation for internal combustion engines, which consists in introducing into the cylinder of the engine a mixture of carboniferous elements and air, the air content of such mixture being less than that sufficient for complete oxidation of the carboniferous elements; starting slow combustion of the mixture; then injecting air under pressure into the cylinder of a quantity sufficient for effecting complete combustion, but inadequate to maintain the pressure in the cylinder, when the pressure in the cylinder has dropped to a predetermined amount, and while the carboniferous elements are still burning, and continuing the same beyond the point of complete combustion, to a point prior to the exhaust, and finally exhausting the gases of combustion.

In testimony whereof, I affix my signature.

WILLIAM B. SMITH WHALEY.